United States Patent
Noda et al.

(10) Patent No.: US 8,260,538 B2
(45) Date of Patent: Sep. 4, 2012

(54) VEHICLE-USE COLLISION MITIGATION APPARATUS

(75) Inventors: Kazuhiro Noda, Nagoya (JP); Yosuke Ito, Kariya (JP); Kazuma Hashimoto, Anjo (JP); Akira Isogai, Anjo (JP)

(73) Assignee: DENSO CORPORATION, Kariya (JP)

( * ) Notice: Subject to any disclaimer, the term of this patent is extended or adjusted under 35 U.S.C. 154(b) by 867 days.

(21) Appl. No.: 12/155,486

(22) Filed: Jun. 5, 2008

(65) Prior Publication Data
US 2008/0312834 A1 Dec. 18, 2008

(30) Foreign Application Priority Data
Jun. 13, 2007 (JP) ................................. 2007-156819

(51) Int. Cl.
*B60W 30/08* (2012.01)
(52) U.S. Cl. ........ 701/301; 701/300; 701/302; 340/901; 340/961; 340/435; 340/436; 342/104; 342/107; 342/118
(58) Field of Classification Search .......... 340/901–903, 340/435–438, 961; 342/3.41, 29–32, 450–455; 367/909; 700/255
See application file for complete search history.

(56) References Cited

U.S. PATENT DOCUMENTS

| | | | | |
|---|---|---|---|---|
| 5,286,099 A * | 2/1994 | Fujita et al. | ................... | 303/125 |
| 5,540,298 A * | 7/1996 | Yoshioka et al. | ............. | 180/169 |
| 5,646,612 A * | 7/1997 | Byon | ........................... | 340/903 |
| 5,699,040 A * | 12/1997 | Matsuda | ........................ | 340/435 |
| 5,742,916 A * | 4/1998 | Bischoff et al. | ................. | 701/45 |
| 6,037,860 A * | 3/2000 | Zander et al. | .................. | 340/436 |
| 6,044,321 A * | 3/2000 | Nakamura et al. | .............. | 701/96 |
| 6,351,211 B1 * | 2/2002 | Bussard | ......................... | 340/468 |
| 6,393,361 B1 * | 5/2002 | Yano et al. | ..................... | 701/301 |
| 6,473,681 B1 * | 10/2002 | Eckert et al. | .................... | 701/70 |
| 6,714,139 B2 * | 3/2004 | Saito et al. | ..................... | 340/903 |
| 6,724,300 B2 * | 4/2004 | Miyakoshi et al. | ........... | 340/435 |
| 6,889,140 B2 * | 5/2005 | Isogai et al. | .................. | 701/301 |

(Continued)

FOREIGN PATENT DOCUMENTS
JP H04-362452 12/1992
(Continued)

OTHER PUBLICATIONS

Office Action dated Apr. 28, 2009 from the Japan Patent Office in the corresponding JP application No. 2007-156819 (and English Translation).

(Continued)

*Primary Examiner* — Jonathan M Dager
(74) *Attorney, Agent, or Firm* — Posz Law Group, PLC (57) ABSTRACT

The vehicle-use collision mitigation apparatus includes a function of calculating a TTC indicative of a time remaining before collision with a forward obstacle on the basis of the distance to this obstacle and the reference speed therebetween, a function of alarming a driver of the vehicle of presence of a risk of collision with the obstacle if the TTC is shorter than a predetermined first time, a function of increasing a braking force generated by a braking operation performed by the driver if the TTC is shorter than a predetermined second time not longer than the predetermined first time, and a function of automatically generating a braking force if the TTC is shorter than a predetermined third time shorter than the predetermined first time. The alarming function is configured to make an alarm for a driver of a following vehicle that the preceding vehicle may decelerate abruptly.

6 Claims, 3 Drawing Sheets

U.S. PATENT DOCUMENTS

| | | | |
|---|---|---|---|
| 7,365,769 B1 * | 4/2008 | Mager | 348/113 |
| 7,607,741 B2 * | 10/2009 | Seto et al. | 303/193 |
| 8,150,583 B2 * | 4/2012 | Danner et al. | 701/45 |
| 2004/0085197 A1 * | 5/2004 | Watanabe et al. | 340/435 |
| 2004/0090320 A1 * | 5/2004 | Suzuki et al. | 340/435 |
| 2004/0122578 A1 * | 6/2004 | Isaji et al. | 701/70 |
| 2004/0193353 A1 * | 9/2004 | Dunoyer et al. | 701/96 |
| 2004/0225424 A1 * | 11/2004 | Yamamura et al. | 701/36 |
| 2004/0236491 A1 * | 11/2004 | Seto | 701/96 |
| 2005/0107955 A1 * | 5/2005 | Isaji et al. | 701/301 |
| 2005/0168328 A1 * | 8/2005 | Kitterer et al. | 340/435 |
| 2005/0267683 A1 * | 12/2005 | Fujiwara et al. | 701/301 |
| 2006/0155469 A1 * | 7/2006 | Kawasaki | 701/301 |
| 2007/0021876 A1 * | 1/2007 | Isaji et al. | 701/1 |
| 2007/0050110 A1 * | 3/2007 | Kondoh et al. | 701/36 |
| 2007/0152803 A1 * | 7/2007 | Huang et al. | 340/435 |
| 2007/0185639 A1 * | 8/2007 | Osborn et al. | 701/71 |
| 2007/0191997 A1 * | 8/2007 | Isaji et al. | 701/1 |
| 2008/0097699 A1 * | 4/2008 | Ono | 701/300 |
| 2008/0269997 A1 * | 10/2008 | Ezoe et al. | 701/70 |
| 2008/0275618 A1 * | 11/2008 | Grimm et al. | 701/96 |
| 2009/0102277 A1 | 4/2009 | Ezoe et al. | |
| 2009/0150034 A1 * | 6/2009 | Ezoe et al. | 701/53 |

FOREIGN PATENT DOCUMENTS

| | | |
|---|---|---|
| JP | A-2002-512148 | 4/2002 |
| JP | A-2002-163797 | 6/2002 |
| JP | A-2003-252192 | 9/2003 |
| JP | 2006-069245 | 3/2006 |
| JP | 2007-004711 | 1/2007 |
| JP | 2007084047 A * | 4/2007 |
| JP | A-2007-084049 | 4/2007 |

OTHER PUBLICATIONS

Office Action dated Aug. 4, 2009 from Japan Patent Office in corresponding JP application No. 2007-156819 (and English translation).

* cited by examiner

VEHICLE-USE COLLISION MITIGATION APPARATUS

CROSS-REFERENCE TO RELATED APPLICATION

This application is related to Japanese Patent Application No. 2007-156819 filed on Jun. 13, 2007 the contents of which are hereby incorporated by reference.

BACKGROUND OF THE INVENTION

1. Field of the Invention

The present invention relates to a vehicle-use collision mitigation apparatus configured to execute a brake assist control to increase a braking force generated by a braking operation of a driver of a vehicle, and automatically generating a braking force if the driver does not perform any braking operation when there is a risk of collision with a forward obstacle.

2. Description of Related Art

There is known a vehicle-use collision avoidance apparatus having an automatic brake control circuit configured to automatically perform a braking operation if there is a high risk of collision with an obstacle. For example, refer to Japanese Patent Application Laid-open No. 4-362452. This automatic brake control circuit automatically performs a braking operation, if it is determined that a measured distance to an obstacle is shorter than a first reference distance set in accordance with a traveling speed of a vehicle. In addition, the automatic brake control circuit notifies a following vehicle of the automatic braking operation being about to start by use of an alarm device, while performing a pumping braking operation, if it is determined that the measured distance to the obstacle is shorter than a second reference distance set longer than the first reference distance.

By giving an alarm to the following vehicle at the same time of performing the pumping braking operation, it becomes possible to increase the possibility of avoiding collision with the following vehicle.

Meanwhile, recently, there is an increasing number of vehicles provided with a brake assist control function which operates to increase a braking force generated by a braking operation by a driver of a vehicle if there is a risk of collision with a forward obstacle. When such a brake assist control function operates, the vehicle tends to decelerate abruptly, because the braking force generated by the braking operation by the driver is increased. Accordingly, in the case of the vehicles provided with the brake assist control function, the possibility of avoiding collision with the following vehicle cannot be lowered much by giving an alarm to the following vehicle at the same time of performing the pumping braking operation.

SUMMARY OF THE INVENTION

The present invention provides a vehicle-use collision mitigation apparatus comprising:

a first function of detecting a distance to a forward obstacle existing ahead of a first vehicle on which the vehicle-use collision mitigation apparatus is mounted in a traveling direction of the first vehicle;

a second function of detecting a relative speed between the first vehicle and the forward obstacle;

a third function of calculating a TTC indicative of a time remaining before collision between the first vehicle and the forward obstacle on the basis of the distance and the reference speed;

a fourth function of alarming a driver of the first vehicle of presence of a risk of collision with the forward obstacle if the TTC is shorter than a predetermined first time;

a fifth function of increasing a first braking force generated by a braking operation performed by the driver if the TTC is shorter than a predetermined second time not longer than the predetermined first time;

a sixth function of automatically generating a second braking force if the TTC is shorter than a predetermined third time shorter than the predetermined first time;

wherein the fourth function is configured to make an alarm for a driver of a second vehicle following the first vehicle that the first vehicle may decelerate abruptly to avoid collision with the forward obstacle at a timing which is the same as, or before a timing at which the fifth function increases the first braking force, and which is before a timing at which the sixth function automatically generates the second braking force.

According to the present invention, it becomes possible to avoid, or at least mitigate the shock of collision between a vehicle provided with the brake assist control function and the automatic brake control function, and a vehicle following this vehicle.

Other advantages and features of the invention will become apparent from the following description including the drawings and claims.

PREFERRED EMBODIMENTS OF THE INVENTION

Figure 1:
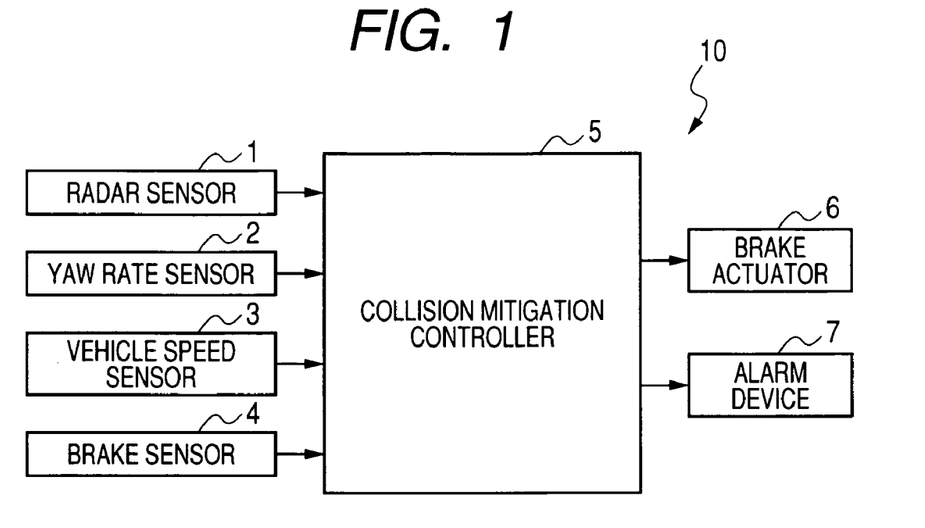
FIG. 1 is a block diagram showing an overall structure of a vehicle-use collision mitigation apparatus according to an embodiment of the invention.

FIG. 1 is a block diagram showing an overall structure of a vehicle-use collision mitigation apparatus 10 according to an embodiment of the invention.

As shown in FIG. 1, the collision mitigation apparatus 10 includes various sensors to obtain information used to determine whether or not there is a risk of collision between the vehicle on which the vehicle-use collision mitigation apparatus 10 is mounted and a forward obstacle such as a preceding vehicle. More specifically, the collision mitigation apparatus 10 includes a radar sensor 1, a yaw rate sensor 2, a vehicle speed sensor 3, and a brake sensor 4.

The radar sensor 1 may be a laser radar sensor configured to emit a laser beam so as to scan a predetermined angular range ahead of the vehicle, in order to detect a distance and direction to a forward obstacle on the basis of the laser beam reflected from the forward obstacle and received by the laser radar sensor. Also, the radar sensor 1 may be a millimeter wave sensor capable of detecting a distance and direction to a forward obstacle, and a relative speed of the vehicle with respect to the forward obstacle by emitting millimeter wave and receiving reflected millimeter wave. Alternatively, instead of the radar sensor 1, a camera and an image processor may be used to detect a distance to a forward obstacle etc., on the basis of an image of the forward obstacle taken by the camera and processed by the image processor.

The yaw rate sensor 2 is for detecting the rate of yaw of the vehicle, which occurs when the traveling direction of the vehicle changes. The traveling direction of the vehicle can be estimated on the basis of the yaw rate of the vehicle detected by the yaw rate sensor 2. In this embodiment, it is determined whether or not the vehicle has a risk of collision with the closest forward obstacle in the estimated traveling direction of the vehicle. The traveling direction of the vehicle may be estimated on the basis of a detection signal of a steering sensor detecting a steering angle of the steering wheel of the vehicle.

The vehicle speed sensor 3 is for detecting a traveling speed of the vehicle. The traveling speed of the vehicle detected by the vehicle speed sensor 3 is used for determining the necessity of control by the collision mitigation apparatus 10, and for calculating the relative speed between the vehicle and the forward obstacle in case a laser radar sensor is used as the radar sensor 1. Incidentally, when the speed of the vehicle is sufficiently low, it is not necessary to assist a braking operation by the driver, nor to automatically perform a braking operation to avoid collision with the forward obstacle. Accordingly, in this embodiment, the collision mitigation apparatus 10 operates only when the speed of the vehicle is lower than a predetermined speed (10 km/h, for example).

The brake sensor 4 outputs a signal indicative of an extent of a braking operation by the driver, such as a depression amount and a moving speed of the brake pedal operated by the driver. On the basis of this signal outputted from the brake sensor 4, a required deceleration which the driver intends to achieve by the driver's braking operation is calculated in accordance with a predetermined formula. The brake sensor 4 may be of the type to detect a brake fluid pressure.

The detection signals outputted from the sensors 1 to 4 are inputted to a collision mitigation controller 5. The collision mitigation controller 5 determines whether or not there is a risk of collision with the forward obstacle on the basis of the detection signals inputted thereto. If the collision mitigation controller 5 determines that there is a risk of collision, it outputs a command signal to a brake actuator 6, as a consequence of which a pre-crash brake assist control (referred to simply as "brake assist control" hereinafter), or a pre-crash automatic brake control executed in order to avoid collision. The brake actuator 6 operates in accordance with the command signal received from the collision mitigation controller 5, to apply a braking force to each wheel of the vehicle.

An alarm device 7 includes a buzzer (or a lamp) to inform the driver of presence of a risk, if any, of collision with the forward obstacle, and a lamp to inform the driver of a following vehicle of that the vehicle (the preceding vehicle) may decelerate abruptly to avoid collision. To make such an alarm to the driver of the following vehicle, a dedicated lamp may be provided in the vehicle, or alternatively, one or more of the existing lamps of the vehicle may be used. For example, by flickering the hazard lamps, or lighting or flickering the brake lamps of the vehicle, it is possible to make such an alarm to the driver of the following vehicle.

To execute the brake assist control, the collision mitigation controller 5 amplifies the required deceleration corresponding to the braking operation by the driver by multiplying this required deceleration by a predetermined factor larger than 1, and outputs a command signal to the brake actuator 6 so that the brake actuator 6 generates a braking force to achieve the amplified deceleration. Accordingly, in case a risk of collision with the forward obstacle has occurred, a braking force larger than a braking force corresponding to the braking operation by the driver can be generated. The automatic brake control is executed when it becomes difficult to avoid collision with the forward obstacle in order to automatically generate a braking force, so that the vehicle speed is lowered at a target deceleration even if the driver does not perform any braking operation to mitigate the shock of collision with the forward obstacle.

Actually, the collision mitigation controller 5 calculates a target vehicle speed on the basis of a required deceleration or a target deceleration, at which the speed of the vehicle is controlled. Through the speed control as described above, the deceleration of the vehicle is brought to the required deceleration or target deceleration.

Next, the operation of the collision mitigation controller 5 is explained with reference to the flowchart shown in FIG. 2.

The operation begins by performing, at step S100, a target selecting process to select, from forward obstacles, a forward obstacle which is the closest to the vehicle in the traveling direction of the vehicle by use of the detection signals from the radar sensor 1 and the yaw rate sensor 2. At subsequent step S110, a start-determining process is performed to determine whether it is necessary to execute the alarm control, brake assist control, or automatic brake control with respect to the forward obstacle selected at step S100. That is, at step S110, it is determined whether it is necessary for the collision mitigation controller 5 to start control operation, and which control should be executed if it is necessary.

If the necessity of the collision mitigation controller 5 starting control operation is determined to exist, and the control to be executed is determined at step S110, the operation proceeds to step S120 where a control processing is performed to execute the determined control. More specifically, at step S120, the collision mitigation controller 5 outputs a command signal to the brake actuator 6 in order to make the deceleration of the vehicle equal to the deceleration to be achieved by the control determined to be executed at step S110. In case it is determined that the alarm control should be executed at step S110, the collision mitigation controller 5 outputs a command signal to the alarm device 7 to cause the alarm device 7 to perform an alarm operation at step S120.

Figure 3:
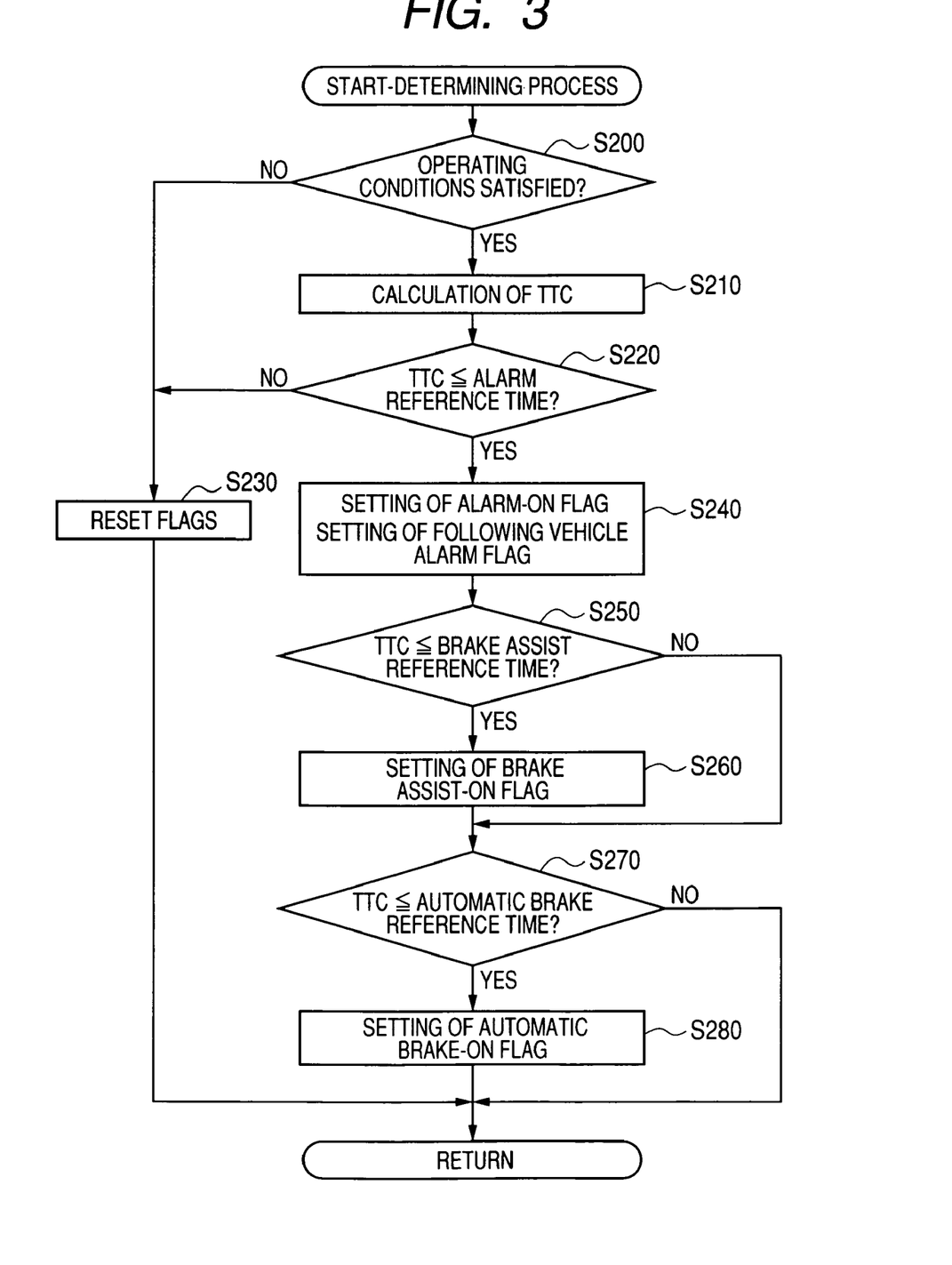
FIG. 3 is a flowchart showing details of a start-determining process performed by the collision mitigation apparatus.

Next, the details of the start-determining process performed at step S110 are explained with reference to the flowchart shown in FIG. 3. The start-determining process begins by determining, at step S200, whether or not predetermined operating conditions to allow the collision mitigation controller 5 to start control operation are satisfied on the basis of the speed of the vehicle etc. If the determination result at step S200 is negative, the process proceeds to step S230, while if the determination result is affirmative, the process proceeds to step S210.

At step S210, a TTC (Time To Collision), which is a time remaining before collision with the forward obstacle, is calculated. In this embodiment, the determination on the necessity of executing the alarm control, brake assist control, or automatic brake control when a risk of collision with the forward obstacle has occurred is made on the basis of the calculated TTC. The TTC can be calculated by dividing the distance to the forward obstacle detected by the radar sensor 1 by the relative speed between the vehicle and the forward obstacle.

The TTC calculated at step S210 is compared with each of an alarm reference time, a brake assist reference time, and an automatic brake reference time predetermined with respect to the alarm control, brake assist control, and automatic brake control, respectively, at steps S220, S250, and S270 as explained below.

After the TTC is calculated at step S210, the process proceeds to step S220 where it is determined whether or not the TTC is equal to or shorter than the alarm reference time. If this determination result is negative, the process proceeds to step S230, while if this determination result is affirmative, the process proceeds to step S240. At step S240, an alarm-on flag, and a following-vehicle alarm flag are set. As a consequence, the driver of the vehicle and the driver of the following vehicle are alarmed by the control processing at step S120 of the flowchart shown in FIG. 2. This alarm is performed for a predetermined time after the alarm flag is set.

Figure 2:
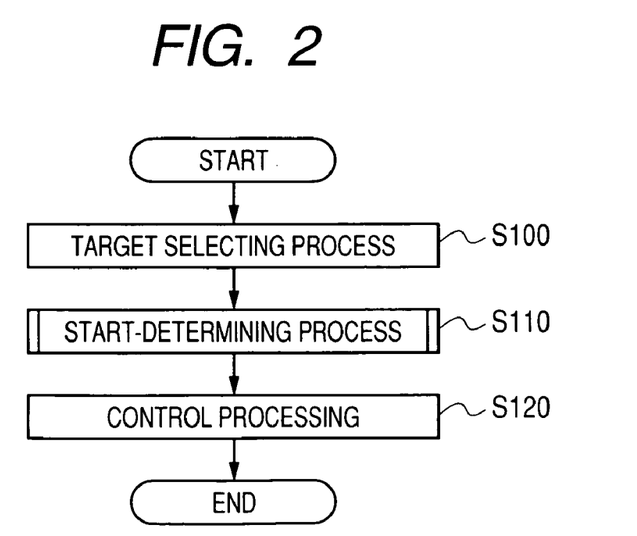
FIG. 2 is a flowchart showing the operation of the collision mitigation apparatus.

In case the predetermined operating conditions are not satisfied, or the TTC is determined to be longer than the alarm reference time, various flags including the alarm flag are reset at step S230, and then the process returns the operation shown in FIG. 2.

At step S250 which follows step S240, it is determined whether or not the TTC is equal to or shorter than the brake assist reference time. If this determination result is negative, the process proceeds to step S270, while if this determination result is affirmative, the process proceeds to step S260 to set a brake assist-on flag, and then proceeds to step S270. As a consequence, the brake assist control is enabled.

At step S270, it is determined whether or not the TTC is equal to or shorter than the automatic brake reference time. If this determination result is negative, the process returns to the operation shown in FIG. 2, while if this determination result is affirmative, the process proceeds to step S280 to set an automatic brake-on flag, and then returns the operation shown in FIG. 2. As a consequence, the automatic brake assist control is executed by the control processing at step S120 of the flowchart shown in FIG. 2.

Next, the above-described various reference times are explained with reference to the graph of FIG. 4. Since each of the reference times is varied depending on the relative speed between the vehicle and the forward obstacle, the reference times are shown as plot lines (referred to as "reference-time plot lines" hereinafter) in this graph.

First, the reference-time plot line corresponding to the automatic brake control is explained.

Figure 4:
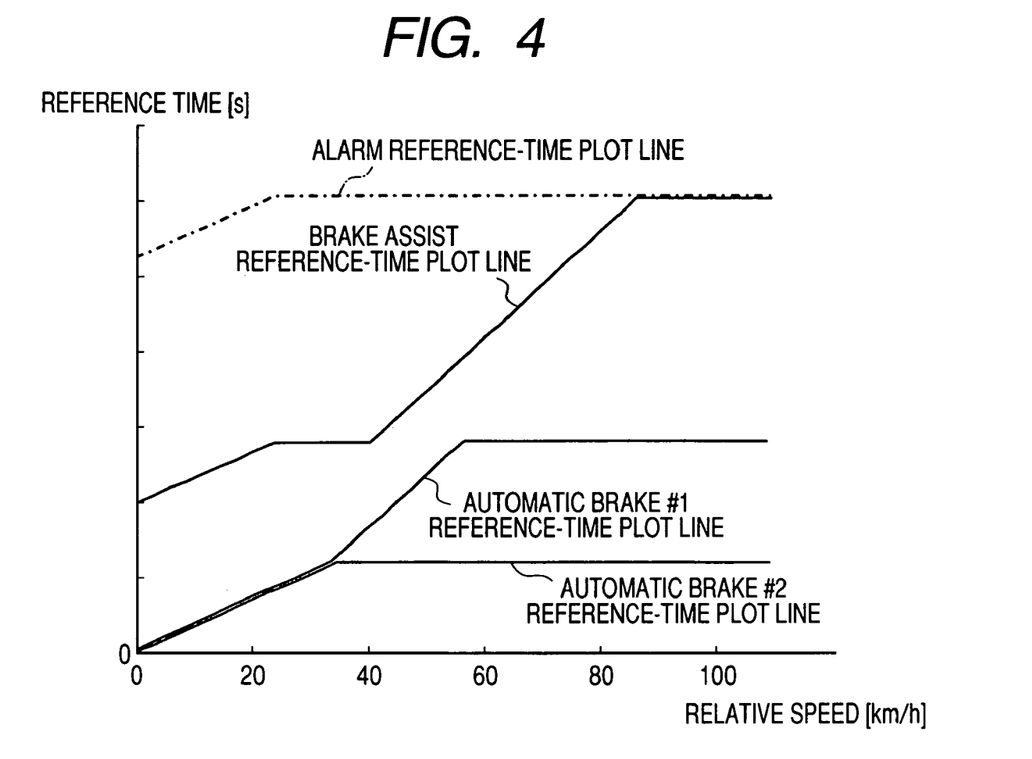
FIG. 4 is a graph explaining various reference times compared with a TTC (Time To Collision) to determine which control should be executed by the collision mitigation apparatus.

In this embodiment, as shown in the graph of FIG. 4, an automatic brake #1 reference-time plot line, and an automatic brake #2 reference-time plot line are provided for the automatic brake control for the purpose of setting a target deceleration in two stages depending on the degree of risk of collision. The automatic brake #2 reference-time plot line is determined as a limit line to avoid collision in view of a possible maximum of deceleration of the vehicle achieved by a driver's braking operation and steering operation.

Even if the driver depresses the brake pedal of the vehicle as hard as possible, the vehicle can decelerate at 0.8 to 1 G at most. Since there is a limit in the deceleration of the vehicle, the time necessary to avoid collision with the forward obstacle increases with the increases of the relative speed between the vehicle and the forward obstacle. Accordingly, the automatic brake #2 reference-time plot line is set such that the automatic brake reference time becomes longer from 0 s with the increase of the relative speed from 0 km/h.

Meanwhile, when the automatic brake reference time becomes longer than a certain time period, it becomes possible to avoid collision by a steering operation by the driver irrespective of the vehicle speed at the time. Accordingly, the automatic brake #2 reference-time plot line is set flat in a range where the relative speed is higher than 35 km/h.

As described above, the automatic brake #2 reference-time plot line is determined as a limit line to avoid collision in view of a possible maximum deceleration of the vehicle achieved by a driver's braking operation and steering operation. Accordingly, in case the calculated TTC is below the automatic brake #2 reference-time plot line, the automatic brake control is executed to automatically decelerate the vehicle at a target deceleration close to the maximum possible deceleration (0.8 G, for example) in order to avoid or at least to mitigate the shock of collision.

As explained above, if the calculated TTC comes below the automatic brake #2 reference-time plot line, the vehicle is decelerated at the target deceleration close to the maximum possible deceleration. Since the automatic brake #2 reference-time plot line is determined as a limit line to avoid collision in view of a possible maximum deceleration of the vehicle as described above, the possibility of avoiding collision can be increased by advancing the timing at which the automatic brake control is started. Also, in some cases, abruptly decelerating the vehicle traveling under no braking at the target deceleration close to the maximum possible deceleration may be too excessive.

Accordingly, the automatic brake #1 reference-time plot line is provided in addition to the automatic brake #2 reference-time plot line. As shown in FIG. 4, the automatic brake #1 reference-time plot line is set such that it is above the automatic brake #1 reference-time plot line in the range where the automatic brake #2 reference-time plot line is flat. If the calculated TTC comes below the automatic brake #1 reference-time plot line, the vehicle is decelerated at a deceleration (0.5 G, for example) smaller than the deceleration used in case the calculated TTC comes below the automatic brake #2 reference-time plot line. Accordingly, in case the relative speed is relatively high, the automatic brake control in accordance the automatic brake #1 reference-time plot line (referred to as "automatic braking #1" hereinafter) is executed, and then the automatic brake control in accordance the automatic brake #2 reference-time plot line (referred to as "automatic braking #2" hereinafter) is executed. This makes it possible to increase the possibility of avoiding collision, and also to lessen the change of the deceleration of the vehicle.

In case a braking operation is already being performed by the driver when the TTC comes below the automatic brake #1 reference-time plot line, the automatic brake control may be suspended. That is because, unlike the automatic brake #2 reference-time plot line, the automatic brake #1 reference-time plot line is not a limit line determined to avoid collision in view of a possible maximum deceleration of the vehicle, and accordingly, in such a case, the automatic brake control does not necessary have to be executed. On the other hand, in case the TTC comes below the automatic brake #1 reference-time plot line, it is preferable to execute the automatic brake control irrespective of whether or not a braking operation is already being performed by the driver. Because, since the risk of collision is very high in such a case, it is necessary to decelerate the vehicle at a rate as high as possible. In this case, the automatic brake control maybe executed preferentially. Also, if the brake assist control is being executed, one of the brake assist control and the automatic brake control, which achieves a larger deceleration may be executed.

The brake assist reference-time plot line is determined as a limit line to avoid collision with the forward obstacle in case the driver performs a normal braking operation, and the braking force by this operation is increased by the brake assist control.

The brake assist reference-time plot line is set such that the range in which the brake assist reference time increases with the increase of the reference speed goes beyond a point of 40 km/h, and is accordingly wide compared to the automatic brake #1 reference-time plot line and the automatic brake #2 reference-time plot line. This makes it possible to avoid collision with the forward obstacle by a normal braking operation by the driver when the relative speed is high, because the timing at which the brake assist control is started is advanced by a value which increases with the increase of the relative speed over a wide range of the brake assist reference time.

The alarm reference-time plot line is determined as a line defining the timing at which the driver of the vehicle and the driver of the following vehicle are alarmed of presence of a risk of collision with the forward obstacle. If the TTC comes below the alarm reference-time plot line, the driver of the vehicle is informed of the risk of collision with the forward obstacle becoming high by an alarm sound generated by the alarm device 7. In addition, the driver of the following vehicle is informed of the possibility that the vehicle (preceding vehicle) may abruptly decelerate to avoid collision with the forward obstacle.

In case such an alarm reference-time plot line is provided, it is preferable that the brake assist reference-time plot line does not come above the alarm reference-time plot line for the reason set forth below. While the brake assist control is under way, if the driver performs a normal braking operation, the resultant braking force is amplified immediately. Accordingly, if the brake assist control starts without giving any information to the driver in advance, the driver may feel strange. Accordingly, in this embodiment, brake assist reference-time plot line is set so as not to come above the alarm reference-time plot line. This also makes it possible to alarm the driver of the following vehicle before the preceding vehicle starts to decelerate abruptly by the action of the brake assist control.

As explained above, the collision mitigation controller 5 determines which control should be executed by comparing the TTC with the various reference-time plot lines.

According to the embodiment of the invention described above, it becomes possible for the driver of the following vehicle to perform a braking or steering operation well in advance to avoid collision with the preceding vehicle which is about to decelerate abruptly by the brake assist control or the automatic brake control.

It is a matter of course that various modifications can be made to the above described embodiment as set forth below.

In the above described embodiment, although each of the reference times is varied depending on the relative speed between the vehicle and the forward obstacle, they may be constant. In this case, of all the reference times, the alarm reference-time is set to be the longest.

A braking device of the vehicle may be so configured that it is set to the standby state when the TTC becomes as short as the brake assist reference time, so that if the driver performs a braking operation, the braking force is generated immediately. This makes it possible to increase the possibility of avoiding collision with the forward obstacle, because the lag between the time when the driver performs a braking operation and the time when the braking force is generated. The braking device can be set to the standby state by preliminarily building up a master cylinder pressure, or preliminarily building up a wheel cylinder pressure, or preliminarily reducing the clearance between a brake pad and a wheel cylinder piston. Further, in case the braking device includes a pump to generate a brake pressure for the brake assist control, the braking device can be set to the standby state by preliminarily driving this pump.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-use collision mitigation apparatus comprising:
    a controller device, the controller device being configured to facilitate
        detecting a distance to a forward obstacle existing ahead of a first vehicle on which said vehicle-use collision mitigation apparatus is mounted in a traveling direction of said first vehicle;
        detecting a relative speed between said first vehicle and said forward obstacle;
        calculating a TTC indicative of a time remaining before collision between said first vehicle and said forward obstacle on the basis of said distance and said reference speed;
        alarming a driver of said first vehicle of presence of a risk of collision with said forward obstacle, when said TTC is shorter than a predetermined first time;
        increasing a first braking force generated by a braking operation performed by said driver, when said TTC is shorter than a predetermined second time not longer than said predetermined first time; and
        automatically generating a second braking force, when said TTC is shorter than a predetermined third time shorter than said predetermined first time;
    said controller device is configured to make an alarm for a driver of a second vehicle following said first vehicle that said first vehicle may decelerate abruptly to avoid collision with said forward obstacle at a timing which is the same as, or before a timing at which said first braking force is increased, and which is before a timing at which said second braking force is automatically generated, wherein
    said predetermined second time is arranged to be varied depending on said relative speed within a range not exceeding said first predetermined time.

2. A vehicle-use collision mitigation apparatus comprising:
    a controller device, the controller device being configured to facilitate
        detecting a distance to a forward obstacle existing ahead of a first vehicle on which said vehicle-use collision mitigation apparatus is mounted in a traveling direction of said first vehicle;
        detecting a relative speed between said first vehicle and said forward obstacle;
        calculating a TTC indicative of a time remaining before collision between said first vehicle and said forward obstacle on the basis of said distance and said reference speed;
        alarming a driver of said first vehicle of presence of a risk of collision with said forward obstacle, when said TTC is shorter than a predetermined first time;
        increasing a first braking force generated by a braking operation performed by said driver, when said TTC is shorter than a predetermined second time not longer than said predetermined first time; and
        automatically generating a second braking force, when said TTC is shorter than a predetermined third time shorter than said predetermined first time;
    said controller device is configured to make an alarm for a driver of a second vehicle following said first vehicle that said first vehicle may decelerate abruptly to avoid collision with said forward obstacle at a timing which is the same as, or before a timing at which said first braking force is increased, and which is before a timing at which said second braking force is automatically generated, wherein said controller device is configured to set a braking apparatus of said first vehicle to a standby state at a timing when said TTC becomes equal to or shorter than said second predetermined time, so that said first braking force is generated immediately when said driver of said first vehicle performs said braking operation.

3. A vehicle-use collision mitigation apparatus comprising:

a controller device, the controller device being configured to facilitate detecting a distance to a forward obstacle existing ahead of a first vehicle on which said vehicle-use collision mitigation apparatus is mounted in a traveling direction of said first vehicle;

detecting a relative speed between said first vehicle and said forward obstacle;

calculating a TTC indicative of a time remaining before collision between said first vehicle and said forward obstacle on the basis of said distance and said reference speed;

alarming a driver of said first vehicle of presence of a risk of collision with said forward obstacle, when said TTC is shorter than a predetermined first time;

increasing a first braking force generated by a braking operation performed by said driver, when said TTC is shorter than a predetermined second time not longer than said predetermined first time; and automatically generating a second braking force, when said TTC is shorter than a predetermined third time shorter than said predetermined first time;

said controller device is configured to make an alarm for a driver of a second vehicle following said first vehicle that said first vehicle may decelerate abruptly to avoid collision with said forward obstacle at a timing which is the same as, or before a timing at which said first braking force is increased, and which is before a timing at which said second braking force is automatically generated, wherein the controller device is configured to set the predetermined second time such that it is shorter than the predetermined first time, when the relative speed is 0, the controller device is configured to set the predetermined second time to increase with an increase of the relative speed within a range not exceeding the predetermined first time.

4. A computer-implemented method, implemented in a vehicle-use collision mitigation apparatus, for performing vehicle-use collision mitigation, comprising:

in a vehicle-use collision mitigation apparatus, detecting a distance to a forward obstacle existing ahead of a first vehicle on which said vehicle-use collision mitigation apparatus is mounted in a traveling direction of said first vehicle;

in said vehicle-use collision mitigation apparatus, detecting a relative speed between said first vehicle and said forward obstacle;

in said vehicle-use collision mitigation apparatus, calculating a TTC indicative of a time remaining before collision between said first vehicle and said forward obstacle on the basis of said distance and said reference speed;

in said vehicle-use collision mitigation apparatus, alarming a driver of said first vehicle of presence of a risk of collision with said forward obstacle, when said TTC is shorter than a predetermined first time;

in said vehicle-use collision mitigation apparatus, increasing a first braking force generated by a braking operation performed by said driver, when said TTC is shorter than a predetermined second time not longer than said predetermined first time; and in said vehicle-use collision mitigation apparatus, automatically generating a second braking force, when said TTC is shorter than a predetermined third time shorter than said predetermined first time;

said vehicle-use collision mitigation apparatus makes an alarm for a driver of a second vehicle following said first vehicle that said first vehicle may decelerate abruptly to avoid collision with said forward obstacle at a timing which is the same as, or before a timing at which said first braking force is increased, and which is before a timing at which said second braking force is automatically generated, wherein said predetermined second time being varied depending on said relative speed within a range not exceeding said first predetermined time.

5. A computer-implemented method, implemented in a vehicle-use collision mitigation apparatus, for performing vehicle-use collision mitigation, comprising:

in a vehicle-use collision mitigation apparatus, detecting a distance to a forward obstacle existing ahead of a first vehicle on which said vehicle-use collision mitigation apparatus is mounted in a traveling direction of said first vehicle;

in said vehicle-use collision mitigation apparatus, detecting a relative speed between said first vehicle and said forward obstacle;

in said vehicle-use collision mitigation apparatus, calculating a TTC indicative of a time remaining before collision between said first vehicle and said forward obstacle on the basis of said distance and said reference speed;

in said vehicle-use collision mitigation apparatus, alarming a driver of said first vehicle of presence of a risk of collision with said forward obstacle, when said TTC is shorter than a predetermined first time;

in said vehicle-use collision mitigation apparatus, increasing a first braking force generated by a braking operation performed by said driver, when said TTC is shorter than a predetermined second time not longer than said predetermined first time;

in said vehicle-use collision mitigation apparatus, automatically generating a second braking force, when said TTC is shorter than a predetermined third time shorter than said predetermined first time;

said vehicle-use collision mitigation apparatus makes an alarm for a driver of a second vehicle following said first vehicle that said first vehicle may decelerate abruptly to avoid collision with said forward obstacle at a timing which is the same as, or before a timing at which said first braking force is increased, and which is before a timing at which said second braking force is automatically generated; and setting a braking apparatus of said first vehicle to a standby state at a timing when said ITC becomes equal to or shorter than said second predetermined time, so that said first braking force is generated immediately when said driver of said first vehicle performs said braking operation.

6. A computer-implemented method, implemented in a vehicle-use collision mitigation apparatus, for performing vehicle-use collision mitigation, comprising:

in a vehicle-use collision mitigation apparatus, detecting a distance to a forward obstacle existing ahead of a first vehicle on which said vehicle-use collision mitigation apparatus is mounted in a traveling direction of said first vehicle;

in said vehicle-use collision mitigation apparatus, detecting a relative speed between said first vehicle and said forward obstacle;

in said vehicle-use collision mitigation apparatus, calculating a TTC indicative of a time remaining before collision between said first vehicle and said forward obstacle on the basis of said distance and said reference speed;

in said vehicle-use collision mitigation apparatus, alarming a driver of said first vehicle of presence of a risk of collision with said forward obstacle, when said TTC is shorter than a predetermined first time;

in said vehicle-use collision mitigation apparatus, increasing a first braking force generated by a braking operation performed by said driver, when said TTC is shorter than a predetermined second time not longer than said predetermined first time; and     in said vehicle-use collision mitigation apparatus, automatically generating a second braking force, when said TTC is shorter than a predetermined third time shorter than said predetermined first time;

said vehicle-use collision mitigation apparatus makes an alarm for a driver of a second vehicle following said first vehicle that said first vehicle may decelerate abruptly to avoid collision with said forward obstacle at a timing which is the same as, or before a timing at which said first braking force is increased, and which is before a timing at which said second braking force is automatically generated, wherein the predetermined second time being set such that it is shorter than the predetermined first time, when the relative speed is 0, the predetermined second time being set to increase with an increase of the relative speed within a range not exceeding the predetermined first time.

* * * * *